United States Patent Office 2,721,183
Patented Oct. 18, 1955

2,721,183

DIBASIC ALKALI METAL ARSENATE AND ALKALI TETRABORATE MIXTURE AS CORROSION INHIBITOR FOR AQUEOUS GLYCOL COMPOSITION

Chester M. White and Robert E. Ivancic, Rochester, N. Y., assignors to Genesee Research Corporation, Rochester, N. Y., a corporation of New York No Drawing. Application October 25, 1951,
Serial No. 253,202

12 Claims. (Cl. 252—74)

This invention relates broadly to new and improved liquid compositions suitable for use in heat exchange and pressure transmitting systems and more specifically to compositions of this character useful as antifreeze solutions and hydraulic brake fluids. Of particular importance is the provision of fluids of this nature inhibited against metal corrosion. Likewise encompassed within the scope of the present invention is the provision of a new metal corrosion inhibitor composition suitable for use in heat exchange and pressure transmitting fluids, such as automotive antifreezes, hydraulic brake fluids and the like.

As is well known to those skilled in the art, glycol base antifreezes possess definite advantages as compared with volatile antifreezes employing lower aliphatic alcohols. However, these glycol base antifreezes have the known disadvantage of causing serious deterioration to metals with which they come into contact in automotive cooling systems, which deterioration manifests itself in very large weight losses and staining in the case of cast iron and steel and some degree of staining in the case of solder, copper and brass. Hydraulic fluids are likewise susceptible to corrosion deterioration of this character.

It is a prime object of the present invention, therefore, to obviate corrosive deterioration of the foregoing character by providing antifreeze and hydraulic fluid compositions inhibited against corrosion, weight loss and undue staining of metals usually attending the use of these fluids.

The foregoing and other objects of the present invention are achieved by incorporating with the glycol or glycol blend certain proportions of a dibasic alkali metal arsenate such as sodium arsenate ($Na_2HAsO_4.7H_2O$) which is also referred to as disodium arsenate, and dipotassium arsenate ($K_2HAsO_4.H_2O$). It has been found further, in accordance with the invention, that these specific chemicals in and of themselves possess metal corrosion inhibiting powers in glycol environment and the invention is predicated, in part at least, upon this discovery. This is particularly true when ethylene glycol per se comprises the glycol base. However, as pointed out more fully hereinafter, it is preferred to employ dibasic arsenates in association with an alkali metal tetraborate such as borax, particularly when a multiple blend of glycols is used as a base, the borax exhibiting a triple function in the final composition of (1) exhibiting its known corrosion inhibiting properties, (2) raising the specific gravity of the solution when two or more glycols are blended to form the base, and (3) providing reserve alkalinity and maintaining the pH of the antifreeze solution above 7. In the final composition the disodium arsenate or dipotassium arsenate is employed in amounts corresponding to 0.15% to 4.0% of the final solution while borax, when indicated, is employed in amounts corresponding to 1.5% to 6.5% of the final solution.

As indicated, ethylene glycol per se may be employed as the glycol base of the antifreeze composition but in many instances it is preferred to employ a blend of two or more glycols. The following are illustrative of the glycol blends which may be employed as the glycol base:

Ethylene glycol-propylene glycol (25% minimum ethylene glycol)
Ethylene glycol-diethylene glycol (25% minimum ethylene glycol)
Ethylene glycol-dipropylene glycol (35% minimum ethylene glycol)
Ethylene glycol-propylene glycol-diethylene glycol-dipropylene glycol (50% minimum ethylene glycol)

It is practically impossible to dissolve the preferred inhibitor combination (disodium arsenate and borax) in pure propylene glycol. Therefore, a small percentage of ethylene glycol is needed to keep the inhibitor combination in solution. Diethylene glycol also shows a decreased solubility for the combination inhibitor so that a similar amount of ethylene glycol is needed for this combination. However, diethylene glycol is usually employed in a minor percentage in the glycol formula since it is a relatively poor freezing point depressant. In the case of the ethylene glycol-dipropylene glycol blend more ethylene glycol is needed to keep the combination inhibitor in solution. In the blend of ethylene, propylene, diethylene and dipropylene glycols, the two latter glycols are present in relatively small amounts (less than 10% for the two glycols).

Since blends using propylene glycol run low on specific gravity, a high percentage of borax is added in order to raise the specific gravity of the blend so that the resultant solution will approach that of the essentially pure ethylene glycol antifreeze. Depending on the specific gravity of the glycol blend the amount of borax is increased until a desired specific gravity is attained. Borax usually contains ten molecules of water of hydration. However, it is now possible to obtain borax with only five molecules of water. This means that a given amount of 5 molecule borax will yield a solution of higher specific gravity than if the 10 molecule borax is employed since less water is added to the glycol solution with the addition of the 5 molecule borax.

A further advantage in the use of the 5 molecule borax in antifreeze formulations is to raise the boiling point of the concentrated antifreeze since small quantities of water depress the boiling point markedly. This is especially true when 5–6% of 10 molecule borax is dissolved in the glycol. In this case 2.5% to 3.0% water has been added to the antifreeze solution. Approximately half this quantity of water is introduced if the 5 molecule borax is employed, assuming a constant percentage of anhydrous borax.

Three glycol blends have been found to be particularly good and these blends are identified as follows: Blend #1 contains 65% ethylene glycol and 35% propylene glycol, while blend #2 contains 76% ethylene glycol, 4% diethylene glycol, 18% propylene glycol, and 2% dipropylene glycol. Blend #3 contains 97% ethylene glycol and 3% diethylene glycol.

With the foregoing glycol blends the following formulae have been developed:

Antifreeze #1:

| | |
|---|---|
| Blend #1 | 95.3725 |
| Borax 5.$H_2O$ | 4.2000 |
| Disodium arsenate | 0.3000 |
| Mixed decyl alcohols | 0.1250 |
| Calcozine Red BX | 0.0025 |

Antifreeze #2:

| | |
|---|---|
| Blend #2 | 95.3725 |
| Borax 5.H$_2$O | 4.2000 |
| Disodium arsenate | 0.3000 |
| Mixed decyl alcohols | 0.1250 |
| Calcozine Red BX | 0.0025 |

Antifreeze #3:

| | |
|---|---|
| Blend #3 | 97.4225 |
| Borax 5.H$_2$O | 2.0000 |
| Disodium arsenate | 0.4500 |
| Mixed decyl alcohols | 0.1250 |
| Calcozine Red BX | 0.0025 |

To test the efficacy of the foregoing antifreeze formulations they were subjected to two types of corrosion tests, the first test being the so-called bench test and the second a simulated radiator test. These tests were carried out in the following manner:

BENCH CORROSION TESTS

Method I

Cast iron, aluminum alloy, copper and brass weighed strips are immersed in a 33⅓% solution of the antifreeze at 70° C. for 5 days. The strips are separately arranged around the sides of a glass jar, which is closed with a cover. No air is introduced into the system. About half of the strip is submerged in the antifreeze so that a vapor liquid interface is formed. At the end of the test the strips are inspected for strain, corrosion and rust, and are cleaned with alcohol and reweighed. In the case of the cast iron strip it is sometimes impossible to obtain an accurate change in weight of the strip by this method since the upper part may develop considerable rust. The change of weight is expressed in milligrams per square centimeter.

Method II

Cast iron, steel, copper, brass and solder weighed strips (3" x ½" x ⅛") are bolted together by means of a stainless steel bolt. Stainless steel washers separate the various strips, so that they are not in contact except at the washer. The set of strips is completely immersed in a 25% aqueous solution of the antifreeze. The strips are held at 70° C. for 7 days, in a closed system. At the end of this time the strips are inspected and then cleaned with alcohol after which they are reweighed. The change of weight is recorded in milligrams per strip.

SIMULATED RADIATOR TESTS

In the bench tests, no air was present during the test run. This omits an important condition to which the antifreeze is exposed during operation in the automobile radiator. To obtain test conditions more nearly similar to those found in a radiator, the so-called simulated radiator test was developed. This consists of a standard radiator, pump, and reservoir (3 gallon capacity) which are connected by pipe so that the antifreeze solution is circulated by the pump from the reservoir to the radiator and back to the reservoir. The several test strips, which are mounted vertically on a rod but separated by a spacer, consists of weighed discs of aluminum alloy, steel, copper, copper-brass-solder, and cast iron. The concentration of the antifreeze solution is 33⅓% by volume. The test is run for 2000 hours. A thermostat maintains the temperature of the solution at 70° C. At the completion of the run the discs are examined for stain, deposits, sludge, etc. They are cleaned in alcohol and reweighed. Since the test is time consuming as well as being rather expensive to conduct (new parts being required for each test), it is run only on the final inhibitor combination. The bench teses are used as screening tests and the simulated radiator test is used as a final check on the inhibitor composition.

The following critical data was noted in the foregoing tests:

| | Antifreeze #1 | Antifreeze #2 | Antifreeze #3 |
|---|---|---|---|
| Specific Gravity @ 60° F | 1.107 | 1.123 | 1.126 |
| Boiling Point (reflux) ° F | 318 | 319 | 345 |
| Flash Point (COC) ° F | 240 | 240 | 240 |
| Reserve Alkalinity | 32.5 | 32.5 | 17.0 |
| Foaming (25% solution) sec | 5 | 5 | 5 |
| pH 50% (by volume) | 7.6 | 7.6 | 7.4 |
| pH 33⅓% (by volume) | 7.9 | 7.8 | 7.7 |
| Water Content percent | 3.4 | 3.6 | 1.9 |
| Freezing Points (Cooling Curve): | | | |
| 10% (by volume) ° F | +25.8 | +25.6 | +25.5 |
| 20% (by volume) ° F | +17.2 | +16.7 | +16.0 |
| 30% (by volume) ° F | +5.0 | +4.3 | +3.0 |
| 40% (by volume) ° F | −11.6 | −11.6 | −14.0 |
| 50% (by volume) ° F | −32.0 | −33.6 | −35.0 |

*Method I.—Corrosions—5 days @ 160° F.—change in weight as mg./sq. cm.*

| | | | |
|---|---|---|---|
| Copper | 0.0 sl s | 0.0 sl s | 0.0 sl s. |
| Brass | 0.0 sl s | 0.0 sl s | 0.0 sl s. |
| Aluminum alloy | 0.0 bs | 0.2 bs | 0.0 bs. |
| Cast iron | 2.7 nil | 0.7 nil | 3.3 nil. |

The weight loss of cast iron should be considered in light of the foregoing explanation of bench test I wherein the strips are only partially submerged and unexposed parts develop a coating of rust which is cleaned off before weighing.

*Method II.—Corrosions—7 days @ 160° F.—change in weight as mg./strip*

| | | | |
|---|---|---|---|
| Copper | 1.7 sl s | 1.1 sl s | 0.4 sl s. |
| Brass | 0.5 sl s | 0.3 sl s | 0.7 sl s. |
| Steel | 1.0 nil | 0.2 nil | 0.2 nil. |
| Solder | 1.4 nil | 1.3 nil | 1.1 nil. |
| Cast iron | 3.0 nil | 1.2 nil | 1.0 nil. |

*Corrosions—Radiator Test—Antifreeze #3—2000 hours—change in weight as mg./strip*

| | |
|---|---|
| Aluminum alloy | −61.0 Hs. |
| Brass | −0.4 sl s. |
| Copper | −0.9 sl s. |
| Copper-brass-solder | +7.5 sl s. |
| Steel | −0.4 nil. |
| Cast iron | +0.2 nil. | s=stain.
bs=black stain.
sl s=slight stain.
Hs=heavy stain.

Additional antifreeze formulations prepared in accordance with the present invention are listed below with corrosion data as determined by bench corrosion tests, Method #I and Method #II:

TYPICAL CORROSION DATA

| Formula # | P-225 | P-232 | P-228 | G-55 | G-56 |
|---|---|---|---|---|---|
| Borax 10 H$_2$O | 4.5 | 2.5 | 3.5 | 5.5 | 6.5 |
| Disodium arsenate | 4.0 | 1.0 | 2.0 | 0.3 | 0.3 |
| Blend #2 | 91.5 | 96.5 | 94.5 | 94.2 | 93.2 |

*Corrosion data, Method I.—Change in weight as mg./sq. cm.*

| | | | | | |
|---|---|---|---|---|---|
| Copper | 0.0 s | 0.0 nil | 0.0 s | 0.0 | 0.0. |
| Brass | 0.0 s | 0.0 sl s | 0.0 s | 0.0 | 0.0. |
| Alluminum alloy | 0.0 Bs | 0.0 gray s | 0.0 gray s | 0.1 Bs | 0.1 Bs. |
| Cast iron | sl s | nil | nil | nil | nil. |

The weight loss on the cast iron strips was not determined in the immediately foregoing tests because of the coating of rust above the liquid level. See the above explanation.

*Corrosion data, Method II.—Change in weight as mg./strip*

| | | | | | |
|---|---|---|---|---|---|
| Brass | 1.1 sl s | 1.6 sl s | 1.4 sl s | 0.7 s | 1.8 s. |
| Copper | 2.2 sl s | 2.5 sl s | 0.9 sl s | 1.9 s | 1.1 s. |
| Steel | 3.1 nil | 2.1 nil | 2.4 nil | 0.8 nil | 1.4 nil. |
| Solder | 3.2 nil | 3.9 nil | 3.4 nil | 0.4 nil | 1.5 nil. |
| Cast iron | 0.0 nil | 0.2 nil | 0.0 nil | 0.6 nil | 0.2 nil. |

Further additional antifreeze formulations, with corrosion data, are listed hereinbelow as further illustrative of the invention:

| | Antifreeze #2b | Antifreeze #2c |
|---|---|---|
| Blend #2 | 95.0725 | 93.0725 |
| Borax 10 H₂O | 4.5000 | 6.5000 |
| Disodium arsenate | 0.3000 | 0.3000 |
| Mixed decyl alcohols | 0.1250 | 0.1250 |
| Calcozine Red DX | 0.0025 | 0.0025 |

Physical data is as follows:

| | Antifreeze #2b | Antifreeze #2c |
|---|---|---|
| Specific Gravity @ 60° F | 1.119 | 1.126 |
| Boiling Point °F | 305 | 298 |
| Flash Point °F | 235 | 230 |
| pH 33⅓% | 7.8 | 7.8 |
| pH 50% | 7.6 | 7.6 |
| Reserve Alkalinity | 27.4 | 39.1 |
| Foaming seconds | 5 | 5 |
| Freezing Points: | | |
| 10% °F | +26.0 | +26.6 |
| 20% °F | +16.2 | +17.0 |
| 30% °F | +3.0 | +5.6 |
| 40% °F | −10.8 | −10.4 |
| 50% °F | −31.6 | −30.8 |

*Corrosions, Method I.—Change in weight as mg./sq. cm.*

| | | |
|---|---|---|
| Copper | 0.0 nil | 0.0 nil. |
| Brass | 0.0 nil | 0.0 nil. |
| Aluminum alloy | 0.0 bs | 0.1 bs. |
| Cast iron | nil | nil. |

*Corrosions, Method II.—Change in weight as mg./strip*

| | | |
|---|---|---|
| Brass | 0.7 sl s | 1.8 sl s. |
| Copper | 0.1 sl s | 1.1 sl s. |
| Steel | 0.7 nil | 1.4 nil. |
| Solder | 0.8 nil | 1.5 nil. |
| Cast iron | 0.1 nil | 0.2 nil. |

It will be noted that borax 10.H₂O was employed in all of the immediately foregoing tests. It is believed that as far as corrosions are concerned it does not matter whether 5 to 10 H₂O borax is employed. When borax is added to the antifreeze, it is noted that rust and stain are still present on the cast iron test strip. As the borax concentration is raised in the glycol base antifreeze, the copper and brass strips also show staining. The addition of disodium arsenate to the borax solutions eliminated the cast iron stain and reduced the degree of staining on copper and brass. The amount of disodium arsenate was varied over a wide range of concentration at several levels of borax concentration. It was found that at 4.5% borax (10.H₂O), the appearance of the test strips and weight losses were essentially the same over the entire range of arsenate concentration (0.15 to 4%). There was no change in appearance of the cast iron, solder, and steel strips. There were slight stains on copper and brass.

At the 5.5 and 6.5% borax level the change in appearance of the various metals was essentially the same. The same conditions prevailed when disodium arsenate was incorporated in the borax solutions. At a level of 3.5% borax, an improvement in the appearance of test strips was noted with the incorporation of disodium arsenate. At lower borax levels (1.5 and 2.5%) the need for arsenate became less evident since the appearance of the cast iron pieces shows less staining. However, the addition of disodium arsenate at the lower levels resulted in very satisfactory corrosion tests both in appearance and weight losses.

Corrosion tests were run with disodium arsenate alone with glycol blend #2. The concentration range varied from 0.3 to 2.0%. The pH of the aqueous solution was somewhat high but aluminum alloy strips were not attacked. The appearance of the brass, copper and solder test strips was excellent. The slight coating on the cast iron test pieces was readily removed by the cleaning procedure. It was found that the extent of the coating was decreased with the higher disodium arsenate percentage.

A typical example is given below:

| | Percent |
|---|---|
| Disodium arsenate | 0.5 |
| Blend #2 | 99.5 |

*Corrosion data, Method I.—Change in weight as mg./sq. cm.*

| | |
|---|---|
| Copper | 0.0 nil |
| Brass | 0.0 nil |
| Aluminum alloy | 0.0 nil |
| Cast iron | 1.0 s |

*Corrosion data, Method II.—Change in weight as mg./strip*

| | |
|---|---|
| Brass | 0.7 nil |
| Copper | 0.1 nil |
| Steel | 1.1 nil |
| Solder | 1.1 nil |
| Cast iron | 15.4 s |

All of the above antifreeze formulae preferably contain a compatible antifoam agent. For a single phase system, an aliphatic long chain alcohol has been found to be effective in small concentrations. The glycol blends have sufficient solubility for the aliphatic alcohol when no water is present so that a single phase system is maintained. Upon the addition of water, the fatty alcohol is thrown out of solution. It rises to the surface of the antifreeze in the reservoir where it forms an oily layer which serves to reduce the foaming tendency of the antifreeze. The following alcohols have been tested and found satisfactory:

1. Decyl alcohol $C_{10}H_{21}OH$
2. Undecyl alcohol $C_{11}H_{23}OH$
3. Octyl alcohol $C_8H_{17}OH$
4. Monyl alcohol $C_9H_{19}OH$ The above alcohols may consist of a mixture of isomers or an individual isomer. The preferred alcohol is the mixed decyl alcohols.

It is also possible to add a soluble oil to the glycol containing borax and disodium arsenate. The purpose of the soluble oil is to prevent leakage of the antifreeze solution through depositing an oily coating on the walls of the cooling system. The addition of the soluble oil does not effect the corrosion data of the original borax-arsenate-glycol mixture. It thus is possible to convert the single phase products to two phase systems if desired by the addition of soluble oil. In general, 0.5 to 1.5% (by weight) of soluble oil is added to the single phase systems. A soluble oil consists of the sodium salt of a sulfonated petroleum oil diluted with nonsulfonated products. The following oils may be used:

1. Pennsylvania oil #3604
2. Solvac #1535
3. Soluble JH
4. Esso Kutwell #2175

Typical specifications for soluble oil are as follows:

| | Percent by weight |
|---|---|
| Sulfonates | 6.5 |
| Petroleum base diluent | 88.5 |
| Water | 5.0 |

A distinctive dye may be added to the glycol to provide a characteristic color. The following dyes may be employed:

1. Calcozine Red BX (Color Index #749)
2. Alizarin Red GWN
3. Alizarin Cyanone Green
4. Methyl Violet 2B
5. Rhodamine B
6. Sudan Blue

What is claimed is:

1. A liquid composition suitable for use in aqueous heat exchange systems and inhibited against metal corrosion, consisting essentially of a blend of 65% ethylene glycol and 35% propylene glycol containing 0.15% to 4.0% of a dibasic alkali metal arsenate and 1.5% to 6.5% of an alkali tetraborate.

2. A liquid composition suitable for use in aqueous heat exchange systems and inhibited against metal corrosion, consisting essentially of a blend of 65% ethylene glycol and 35% propylene glycol containing 0.15% to 4.0% of disodium arsenate and 1.5% to 6.5% of borax.

3. A liquid composition suitable for use in aqueous heat exchange systems and inhibited against metal corrosion, consisting essentially of a blend of 76% ethylene glycol, 4% diethylene glycol, 18% propylene glycol and 2% dipropylene glycol containing 0.15% to 4.0% of disodium arsenate and 1.5% to 6.5% of borax.

4. A liquid composition suitable for use in aqueous heat exchange systems and inhibited against metal corrosion, consisting essentially of a blend of 97% ethylene glycol and 3% diethylene glycol containing 0.15% to 4.0% of disodium arsenate and 1.5% to 6.5% borax.

5. A liquid composition suitable for use in aqueous heat exchange systems and inhibited against metal corrosion, consisting essentially of the following ingredients approximately in the percentages indicated:

| | Percent by weight |
|---|---|
| Ethylene glycol | 62.0000 |
| Propylene glycol | 33.3725 |
| Sodium tetraborate pentahydrate | 4.2000 |
| Disodium arsenate | 0.3000 |
| Mixed decyl alcohols | 0.1250 |
| Coloring dye | 0.0025 |
| | 100.0000 |

6. A liquid composition suitable for use in aqueous heat exchange systems and inhibited against metal corrosion, consisting essentially of the following ingredients approximately in the percentages indicated:

| | Percent by weight |
|---|---|
| Ethylene glycol | 72.5000 |
| Diethylene glycol | 3.8200 |
| Propylene glycol | 17.1425 |
| Dipropylene glycol | 1.9100 |
| Sodium tetraborate pentahydrate | 4.2000 |
| Disodium arsenate | 0.3000 |
| Mixed decyl alcohols | 0.1250 |
| Coloring dye | 0.0025 |
| | 100.0000 |

7. A liquid composition suitable for use in aqueous heat exchange systems and inhibited against metal corrosion, consisting essentially of the following ingredients approximately in the percentages indicated:

| | Percent by weight |
|---|---|
| Ethylene glycol | 94.4998 |
| Diethylene glycol | 2.9227 |
| Sodium tetraborate pentahydrate | 2.0000 |
| Disodium arsenate | 0.4500 |
| Mixed decyl alcohols | 0.1250 |
| Coloring dye | 0.0025 |
| | 100.0000 |

8. A liquid composition suitable for use in aqueous heat exchange systems and inhibited against metal corrosion, consisting essentially of an alkylene glycol base containing 0% to 35% propylene glycol and the remainder ethylene glycol, said base also containing 0.15% to 4.0% of a dibasic alkali metal arsenate and 1.5% to 6.5% of an alkali tetraborate.

9. A liquid composition suitable for use in aqueous heat exchange systems and inhibited against metal corrosion, consisting essentially of an alkylene glycol base containing 0% to 35% propylene glycol and the remainder ethylene glycol, said base also containing 0.15% to 4.0% of disodium arsenate and 1.5% to 6.5% of borax.

10. A liquid composition suitable for use in aqueous heat exchange systems and inhibited against metal corrosion, consisting essentially of an alkylene glycol base containing 0% to 4% diethylene glycol, 0% to 35% propylene glycol, 0% to 2% dipropylene glycol, and the remainder ethylene glycol, said base also containing 0.15% to 4.0% of disodium arsenate and 1.5% to 6.5% of borax.

11. A liquid composition suitable for use in aqueous heat exchange systems and inhibited against metal corrosion, consisting essentially of an alkylene glycol base containing 0% to 35% propylene glycol, and the remainder ethylene glycol, said base also containing 0.15% to 4.0% of disodium arsenate, 1.5% to 6.5% of borax, an anti-foaming agent and a coloring dye.

12. A liquid composition suitable for use in aqueous heat exchange systems and inhibited against metal corrosion, consisting essentially of an alkylene glycol base containing 0% to 35% propylene glycol, 0% to 10% of a mixture of diethylene glycol and dipropylene glycol, the remainder ethylene glycol, said base also containing 0.15% to 4.0% of disodium arsenate and 1.5% to 6.5% borax.

References Cited in the file of this patent

UNITED STATES PATENTS

| | | |
|---|---|---|
| 1,638,710 | Sherbino | Aug. 9, 1927 |
| 1,698,973 | Tseng | Jan. 15, 1929 |
| 1,877,504 | Grebe et al. | Sept. 13, 1932 |
| 1,903,041 | Hall et al. | Mar. 28, 1933 |
| 2,031,632 | Bottoms | Feb. 25, 1936 |
| 2,384,553 | Kiffer | Sept. 11, 1945 |
| 2,566,924 | Burghart | Sept. 4, 1951 |

FOREIGN PATENTS

| | | |
|---|---|---|
| 574,129 | Great Britain | Dec. 21, 1945 |